United States Patent
Kim

(10) Patent No.: US 12,554,021 B2
(45) Date of Patent: Feb. 17, 2026

(54) METHOD AND APPARATUS FOR DETECTING DECEPTION SIGNAL IN GLOBAL NAVIGATION SATELLITE SYSTEM

(71) Applicant: ELECTRONICS AND TELECOMMUNICATIONS RESEARCH INSTITUTE, Daejeon (KR)

(72) Inventor: Tae Hee Kim, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 362 days.

(21) Appl. No.: 17/971,839

(22) Filed: Oct. 24, 2022

(65) Prior Publication Data
US 2023/0137969 A1    May 4, 2023

(30) Foreign Application Priority Data

Nov. 2, 2021 (KR) .................. 10-2021-0149139
Oct. 4, 2022 (KR) .................. 10-2022-0126071

(51) Int. Cl.
*G01S 19/21*  (2010.01)
*G01S 19/29*  (2010.01)
*G01S 19/30*  (2010.01)

(52) U.S. Cl.
CPC .......... *G01S 19/215* (2013.01); *G01S 19/29* (2013.01); *G01S 19/30* (2013.01)

(58) Field of Classification Search
CPC ........ G01S 19/215; G01S 19/29; G01S 19/30
See application file for complete search history.

(56) References Cited

U.S. PATENT DOCUMENTS 7,127,011 B2    10/2006    Rowitch
9,494,691 B2    11/2016    Gum et al.
(Continued)

FOREIGN PATENT DOCUMENTS

CN    109444922 A  *  3/2019
JP    2008-527845 A    7/2008
(Continued)

OTHER PUBLICATIONS

L.R. Weill, GNSS Solutions: Differences between Signal Acquisition and Tracking, InsideGNSS, Jan./Feb. 2011, p. 22-27 (Year: 2011).*

(Continued)

*Primary Examiner* — Robert W Hodge
*Assistant Examiner* — Fred H Mull
(74) *Attorney, Agent, or Firm* — LRK PATENT LAW FIRM

(57) ABSTRACT

A method of operating a satellite navigation receiver in a global navigation satellite system may include: receiving a satellite navigation signal; performing a first signal acquisition process with respect to at least one left-handed circular polarization (LHCP) signal included in the satellite navigation signal; and determining presence of a deception signal when at least one first satellite number, at least one first code position, and at least one pieces of first Doppler information are acquired with respect to the at least one LHCP signal through the first signal acquisition process.

12 Claims, 5 Drawing Sheets

(56) References Cited

U.S. PATENT DOCUMENTS

| | | |
|---|---|---|
| 9,716,541 B2 | 7/2017 | Sanderovich et al. |
| 10,720,986 B2 | 7/2020 | Mengwasser et al. |
| 2007/0087787 A1 | 4/2007 | Washiro |
| 2010/0203884 A1 | 8/2010 | Zheng et al. |
| 2011/0068973 A1 | 3/2011 | Humphreys et al. |
| 2011/0279309 A1 | 11/2011 | Jeong et al. |
| 2014/0111378 A1 | 4/2014 | Kim et al. |
| 2015/0123846 A1 | 5/2015 | Jeong et al. |
| 2018/0224557 A1* | 8/2018 | McMilin ............... G01S 19/215 |
| 2020/0274251 A1 | 8/2020 | Sakamoto et al. |
| 2022/0050213 A1 | 2/2022 | De Wilde et al. |
| 2023/0096975 A1* | 3/2023 | Pon ........................ G01S 19/22 455/456.1 |

FOREIGN PATENT DOCUMENTS

| | | |
|---|---|---|
| JP | 2016-511719 A | 4/2016 |
| KR | 10-1708381 B1 | 2/2017 |
| KR | 10-1930354 B1 | 12/2018 |
| KR | 10-2021-0120499 A | 10/2021 |

OTHER PUBLICATIONS

E. McMilin et al., Single Antenna GPS Spoof Detection that is Simple, Static, Instantaneous and Backwards Compatible for Aerial Applications, Proceedings of the 27th International Technical Meeting of the Satellite Division of The Institute of Navigation (Ion GNSS+ 2014), p. 2233-2242 (Year: 2014).*

K. Kobayashi et al., Spoofing Detection on Ships Using Multipath Monitoring and Moving-baseline Analysis, 33rd International Technical Meeting of the Satellite Division of The Institute of Navigation (Ion GNSS+ 2020), 24 pages (Year: 2020).*

When 2. (2012). In Merriam-Webster's Collegiate(R) Dictionary (11th ed.). Merriam-Webster. https://search.credoreference.com/articles/Qm9va0FydGljbGU6MjU1Njk5 (Year: 2012).*

When, Thesaurus.com, https://www.thesaurus.com/browse/when, downloaded on Mar. 25, 2025 (Year: 2025).*

* cited by examiner

METHOD AND APPARATUS FOR DETECTING DECEPTION SIGNAL IN GLOBAL NAVIGATION SATELLITE SYSTEM

CROSS-REFERENCE TO RELATED APPLICATIONS

This application claims priority to Korean Patent Applications No. 10-2021-0149139, filed on Nov. 2, 2021, and No. 10-2022-0126071, filed on Oct. 4, 2022, with the Korean Intellectual Property Office (KIPO), the entire contents of which are hereby incorporated by reference.

BACKGROUND

1. Technical Field

The disclosure relates to technology for detecting a deception signal in a global navigation satellite system, and more particularly to technology for detecting a deception signal in a global navigation satellite system, in which a result of acquiring a left-handed circular polarization component is used to improve the accuracy of detecting the deception signal.

2. Description of Related Art

A global positioning system (GPS) employs a navigation satellite and a satellite navigation receiver to provide the location, altitude, speed, etc. of a moving object. Recently, the use of such a global navigation satellite system has recently been extended to all the fields of industry. As the use of the global navigation satellite system has been extended to all the fields of industry, malicious actions are also frequently carried out to disturb that system. Such disturbances in the global navigation satellite system may be caused by a jamming signal or a deception signal. For example, the satellite navigation receiver may not receive a satellite navigation signal due to the jamming signal in a frequency band of the global navigation satellite system. Further, the satellite navigation receiver may continue to calculate navigation solution data for incorrect location and time due to a deception signal that imitates the satellite navigation signal.

As an example of such a deceptive attack, in 2011, the Iranian government deceived a drone of the United States into landing. In addition, another example of a deceptive attack, Russia deliberately used a deception signal to deceive ships near the Black Sea into moving to land. Meanwhile, as one example of showing that a deceptive attack is possible, a research group at the University of Texas in the United States succeeded in a test on hijacking a ship several kilometers. Like this, the deceptive attack that may cause great damage depending on an attacker's intention may occur frequently. Such a deceptive attack may be given in the form of continuously deceiving a location of a target receiver into moving in the desired direction or to the desired location, or transmitting the deception signal to a specific location to disturb the location of the satellite navigation receiver.

When the deceptive attack takes the location of the satellite navigation receiver into account, a terminal that is a target of the deceptive attack may be continuously exposed to the deceptive attack even though the terminal moves its location. On the other hand, when the deceptive attack uses the deception signal to be stationarily transmitted to a specific area, a terminal that is a target of the deceptive attack may escape from the deceptive attack by leaving that area. Therefore, if the satellite navigation receiver periodically monitors information about a currently received signal and acquires dual polarization of the received signal, it is possible to quickly and accurately determine where there is a deception, and rapidly take a measure.

SUMMARY

An aspect of the disclosure is to provide a method and apparatus for detecting a deception signal in a global navigation satellite system, in which a result of acquiring a left-handed circular polarization component is used to improve the accuracy of detecting the deception signal.

According to a first exemplary embodiment of the present disclosure, a method of operating a satellite navigation receiver in a global navigation satellite system may comprise: receiving a satellite navigation signal; performing a first signal acquisition process with respect to at least one left-handed circular polarization (LHCP) signal included in the satellite navigation signal; and determining presence of a deception signal when at least one first satellite number, at least one first code position, and at least one pieces of first Doppler information are acquired with respect to the at least one LHCP signal through the first signal acquisition process.

The performing the first signal acquisition process with respect to the at least one LHCP signal included in the satellite navigation signal may comprise: sampling the at least one LHCP signal included in the satellite navigation signal into a digital LHCP signal; generating a satellite navigation pseudo random noise (PRN) code and carrier table information; and detecting the at least one first satellite number, the at least one first code position, and the at least one piece of first Doppler information in the digital LHCP signal based on the satellite navigation PRN code and the carrier table information.

The method may further comprise: performing a second signal acquisition process with respect to at least one right-handed circular polarization (RHCP) signal included in the satellite navigation signal; detecting at least one second satellite number, at least one second code position, and at least one pieces of second Doppler information the second signal acquisition process; calculating at least one navigation solution based on the at least one second satellite number, the at least one second code position, and the at least one piece of second Doppler information; and estimating a location based on a navigation solution obtained by excluding a navigation solution, which is calculated from the RHCP signal corresponding to the at least one first satellite number, from the at least one navigation solution.

According to a second exemplary embodiment of the present disclosure, a method of operating a satellite navigation receiver in a global navigation satellite system may comprise: receiving a satellite navigation signal; estimating presence of at least one deception signal based on at least one right-handed circular polarization (RHCP) signal included in the satellite navigation signal; and determining whether the presence of the at least one deception signal based on at least one left-handed circular polarization (LHCP) signal included in the satellite navigation signal when the presence of the at least one deception signal is estimated.

The estimating the presence of the at least one deception signal based on the at least one RHCP signal included in the satellite navigation signal may comprise: acquiring measurement information with respect to each of the at least one RHCP signal included in the satellite navigation signal; and estimating the presence of the at least one deception signal by determining whether the acquired measurement information is abnormal.

The measurement information may comprise at least one of a carrier-to-noise density ratio (C/No), a reception signal strength, a code position, a Doppler frequency, a carrier phase, or a pseudorange.

The estimating the presence of the at least one deception signal based on the at least one RHCP signal included in the satellite navigation signal may comprise: acquiring each code position and each Doppler frequency with respect to the at least one RHCP signal included in the satellite navigation signal; calculating each navigation solution error based on each code position and each Doppler frequency; and estimating the presence of the at least one deception signal by determining whether the calculated navigation solution error is abnormal.

The calculating each navigation solution error based on each code position and each Doppler frequency may comprise: calculating each piece of bit information based on each code position and each Doppler frequency; generating each navigation message based on each piece of bit information; calculating each piece of pseudorange measurement information based on each code position and each Doppler frequency; calculating each navigation solution based on each piece of bit information and each navigation message; and calculating each navigation solution error based on each navigation solution.

The estimating the presence of the at least one deception signal based on the at least one RHCP signal included in the satellite navigation signal may comprise: acquiring each piece of measurement information with respect to at least one RHCP signal included in the satellite navigation signal; estimating the presence of the at least one deception signal based on the acquired measurement information; acquiring each code position and each Doppler frequency with respect to at least one RHCP signal included in the satellite navigation signal when the presence of the at least one deception signal is estimated as a result of the estimating; and estimating the presence of the at least one deception signal again based on the calculated navigation solution error.

According to a third exemplary embodiment of the present disclosure, a satellite navigation receiver may comprise a processor, the processor being configured to control the satellite navigation receiver to: receiving a satellite navigation signal; estimating presence of at least one deception signal based on at least one right-handed circular polarization (RHCP) signal included in the satellite navigation signal; and determining whether the presence of the at least one deception signal based on at least one left-handed circular polarization (LHCP) signal included in the satellite navigation signal when the presence of the at least one deception signal is estimated.

When the presence of the at least one deception signal is estimated based on the at least one RHCP signal included in the satellite navigation signal, the processor may be configured to control the satellite navigation receiver to: acquire measurement information with respect to each of the at least one RHCP signal included in the satellite navigation signal; and estimate the presence of the at least one deception signal by determining whether the acquired measurement information is abnormal.

When the presence of the at least one deception signal is estimated based on the at least one RHCP signal included in the satellite navigation signal, the processor may be configured to control the satellite navigation receiver to: acquire each code position and each Doppler frequency with respect to the at least one RHCP signal included in the satellite navigation signal; calculate each navigation solution error based on each code position and each Doppler frequency; and estimate the presence of the at least one deception signal by determining whether the calculated navigation solution error is abnormal.

According to the disclosure, the satellite navigation receiver may detect a deception signal based on a result of acquiring the LHCP component. Therefore, the satellite navigation receiver can quickly determine whether to use the navigation solution of the receiving channel contaminated by the deception signal.

In addition, the satellite navigation receiver according to the disclosure may determine a deception suspicion step when measurement information about the C/No, the pseudorange, the Doppler frequency, the carrier phase, etc. is abnormal. Further, the satellite navigation receiver according to the disclosure may determine a deception warning step upgraded from the deception suspicion step when the navigation solution is abnormal.

Then, the satellite navigation receiver according to the disclosure may finally determine whether the deception is present or not based on the result of acquiring the LHCP component in the deception warning step. In this way, the satellite navigation receiver according to the disclosure can determine the presence of the deception signal based on the result of acquiring the LHCP component in the deception warning step, thereby improving the accuracy in detecting the deception signal.

DETAILED DESCRIPTION OF THE EMBODIMENTS

Figure 1:
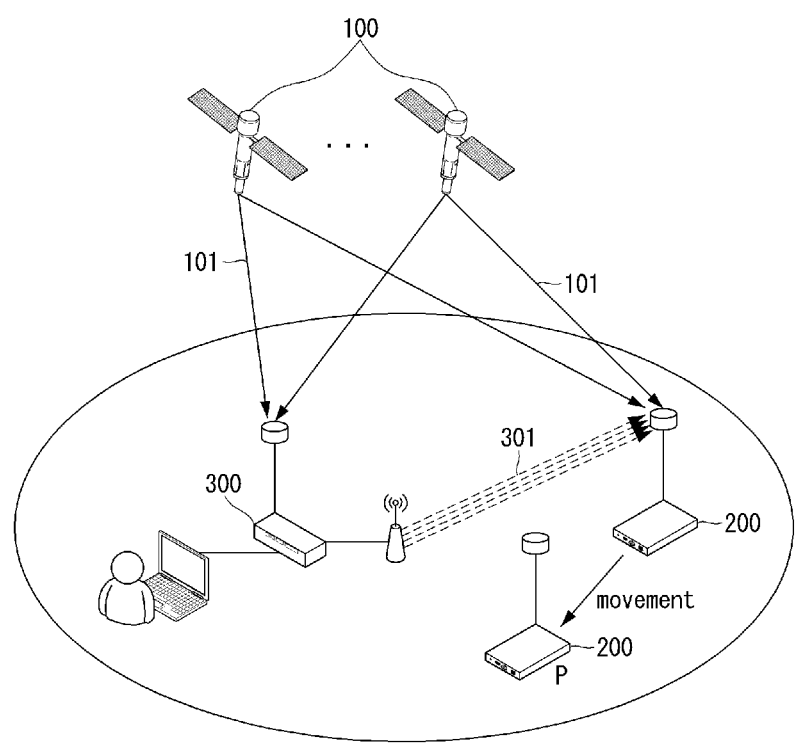
FIG. 1 is a conceptual view of a first embodiment of a global navigation satellite system.

Exemplary embodiments of the present disclosure are disclosed herein. However, specific structural and functional details disclosed herein are merely representative for purposes of describing exemplary embodiments of the present disclosure. Thus, exemplary embodiments of the present disclosure may be embodied in many alternate forms and should not be construed as limited to exemplary embodiments of the present disclosure set forth herein.

Accordingly, while the present disclosure is capable of various modifications and alternative forms, specific exemplary embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular exemplary embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

FIG. 1 is a conceptual view of a first embodiment of a global navigation satellite system.

Referring to FIG. 1, a navigation satellite 100 in a global navigation satellite system may generate and transmit a navigation signal 101 to the ground. Here, the navigation signal 101 may be a signal by which a navigation message is subjected to band spread with a coarse/acquisition (C/A) code and then carried by an L1 frequency (1575.42 MHz). The navigation message may include at least one of the orbit, time correction, or other system elements of that navigation satellite 100. The C/A code may include a unique pseudo random noise (PRN) code assigned to each navigation satellite 100. The PRN code may have a code length of 1023 chips. In other words, the navigation satellites 100 may have different C/A codes but have the same length of 1023 chips. The PRN code is generated per 1 millisecond, and therefore 1 code (=1 chip) may have a time length of about 1 microsecond.

Then, a satellite navigation receiver 200 may receive a navigation signal 101 from each navigation satellite 100. In addition, the satellite navigation receiver 200 may calculate its own location, speed and time by processing the navigation signals 101 received from the navigation satellites 100.

Meanwhile, a deception attacker 300 may receive the navigation signals 101 from the navigation satellites 100. In addition, the deception attacker 300 generates a false deception signal 301 to be synchronized with the received navigation signal 101 and transmits the deception signal 301 toward the satellite navigation receiver 200. In this case, the deception attacker 300 may generate the deception signals 301 for the navigation signals 101 received from the navigation satellites 100, and transmit the deception signals 301 toward the satellite navigation receivers 200. In this way, the deception attacker 300 may generate the deception signal 301 including the false information, and transmit the deception signal 301 toward the satellite navigation receiver 200, thereby making a deceptive attack on the satellite navigation receiver 200. Here, the false information may for example include at least one of false satellite location information, false time information, false correction-related information, or false pseudorange information.

Meanwhile, the deception attacker 300 may transmit the deception signal 301 as a signal higher by 3 to 5 dB than a normal navigation signal transmitted from the navigation satellite 100. Thus, the satellite navigation receiver 200 may track not the navigation signal 101 transmitted from the navigation satellite 100 but the deception signal 301. As a result, the satellite navigation receiver 200 is likely to receive the deception signal 301 including the false information from the deception attacker 300. In addition, the satellite navigation receiver 200 may erroneously calculate its location, speed and time due to the false information included in the deception signal 301. Thus, the satellite navigation receiver 200 may move to a wrong location P.

In general, the navigation satellite 100 may transmit a right-handed circular polarization (RHCP) navigation signal as the navigation signal 101. Then, the satellite navigation receiver 200 may receive the RHCP navigation signal from the navigation satellite 100. The satellite navigation receiver 200 may generate a navigation solution by processing the received RHCP navigation signal. In this case, there may be few elements to deform the polarization between two points of the navigation satellite 100 and the satellite navigation receiver 200. Thus, the satellite navigation receiver 200 may receive the RHCP navigation signal from the navigation satellite 100 without attenuation or distortion.

However, the navigation signal 101 transmitted from the navigation satellite 100 may be reflected from buildings when propagating in the heart of a city. Therefore, a weak left-handed circular polarization (LHCP) navigation signal may be generated as derived from the RHCP navigation signal. As a result, the navigation satellite receiver 200 may receive the weak LHCP navigation signal, the polarization of which is opposite to that of the RHCP navigation signal. The LHCP navigation signal may work due to the effects of multipath, and cause the satellite navigation receiver 200 to deteriorate in the performance of generating the navigation solution.

Meanwhile, the deception attacker 300 generally transmits the deception signal 301 from the ground unlike the location of the navigation satellite 100 when transmitting the deception signal 301 for the deceptive attack. In this case, the deception attacker 300 may transmit the RHCP deception signal and the LHCP deception signal as the deception signal 301. In addition, the RHCP deception signal and the LHCP deception signal may have almost the same transmission power. As a result, the navigation satellite receiver 200 may receive the RHCP deception signal and the LHCP deception signal with almost the same signal strength.

In addition, the deception attacker 300 may transmit only the RHCP deception signal like the navigation satellite 100. In this case, the LHCP deception signal may derive as the RHCP deception signal is reflected from various structures on the ground and the surface of the earth during the transmission. Thus, the deception signal 301 may include the RHCP deception signal and the LHCP deception signal. In this case, the RHCP deception signal and the LHCP deception signal may have almost the same transmission power. As a result, the navigation satellite receiver 200 may receive the RHCP deception signal and the LHCP deception signal with almost the same signal strength.

When the deceptive attack is made as above, the satellite navigation receiver 200 may receive the RHCP navigation signal the navigation satellite 100 and receive the RHCP deception signal and the LHCP deception signal from the deception attacker 300. In this way, the satellite navigation receiver 200 may receive the RHCP signal including the RHCP navigation signal and the RHCP deception signal. In addition, the satellite navigation receiver 200 may receive the LHCP signal including the LHCP deception signal. In this state, a general satellite navigation receiver processes only the RHCP signal, and therefore processes the RHCP deception signal, the signal strength of which is higher than that of the RHCP navigation signal, encountering the deceptive attack.

Figure 2:
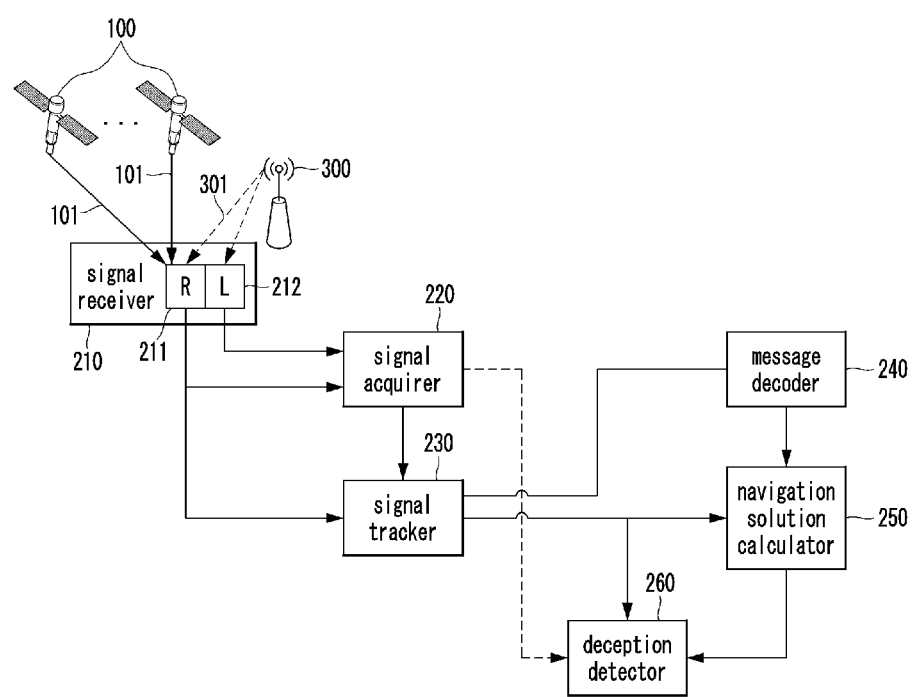
FIG. 2 is a block diagram showing a first embodiment of the navigation satellite receiver shown in FIG. 1.

FIG. 2 is a block diagram showing a first embodiment of the navigation satellite receiver shown in FIG. 1.

Referring to FIG. 2, the navigation satellite receiver 200 may include a signal receiver 210, a signal acquirer 220, a signal tracker 230, a message decoder 240, a navigation solution calculator 250, and a deception detector 260. In this case, the signal receiver 210 may include an RHCP receiving module 211 and an LHCP receiving module 212.

With this configuration, under a normal condition that the deception attacker 300 makes no deceptive attack, the navigation satellite receiver 200 may process the received signal as follows. First, the navigation satellites 100 may transmit the navigation signals to the navigation satellite receiver 200. In this case, the navigation signal may be the RHCP navigation signal. Then, the signal receiver 210 may receive the navigation signals from the navigation satellites 100. Specifically, the RHCP receiving module 211 of the signal receiver 210 may receive the RHCP navigation signal from each navigation satellite 100. In addition, the RHCP receiving module 211 may provide the received RHCP navigation signals to the signal acquirer 220.

Next, the signal acquirer 220 may perform a signal acquisition process of detecting a code position and a Doppler frequency with respect to each navigation signal through a two-dimensional search for a code delay and a Doppler frequency. Here, the signal acquisition process may be a process for detecting the code position and Doppler frequency of each RHCP navigation signal. Such a signal acquisition process may be performed on the principle that the highest signal strength is detected when the C/A code generated for the navigation satellite 100 matches and the C/A code of the signal received from that navigation satellite 100. The signal acquirer 220 may measure the signal strength by moving the C/A code generated by itself at the Doppler frequencies at intervals of 1 chip until the generated C/A code correlates with the C/A code of that navigation satellite 100, and determine the code position and the Doppler frequency of that navigation satellite 100 based on the measured signal strength. In addition, the signal acquirer 220 may provide the code position and the Doppler frequency detected with respect to each RHCP navigation signal to the signal tracker 230.

Then, the signal tracker 230 may calculate bit information by tracking each RHCP navigation signal through a code tracking loop and a carrier based on the code position and the Doppler frequency detected with respect to each RHCP navigation signal, and measures a pseudorange. In this case, the signal tracker 230 may use a phase locked loop (PLL), a frequency locked loop (FLL), etc. as a carrier tracking loop, and use a delay lock loop (DLL) as the code tracking loop. The signal tracker 230 may provide the bit information calculated with respect to each RHCP navigation signal to the message decoder 240, and provide pseudorange measurement information calculated with respect to each RHCP navigation signal to the navigation solution calculator 250.

Thus, the message decoder 240 may decode each RHCP navigation signal based on the bit information calculated by the signal tracker 230 with respect to each RHCP navigation signal, thereby extracting a navigation message. In addition, the message decoder 240 may provide the navigation message extracted with respect to each RHCP navigation signal to the navigation solution calculator 250. Meanwhile, the navigation solution calculator 250 may calculate the location by calculating the navigation solution with respect to each RHCP navigation signal based on the navigation message extracted with respect to each RHCP navigation signal received from the message decoder 240 and the pseudorange measurement information calculated with respect to each RHCP navigation signal received from the signal tracker 230.

As mentioned above, when the normal navigation signal is processed, the navigation satellite receiver 200 may use the RHCP receiving module 211 of the signal receiver 210 to receive and process the signal transmitted as the RHCP from the navigation satellite 100. In this case, the LHCP receiving module 212 of the signal receiver 210 may not receive the LHCP signal. Thus, the LHCP receiving module 212 may not provide the LHCP signal to the signal acquirer 220. In this way, the signal acquirer 220 may not receive the LHCP signal from the LHCP receiving module 212. As a result, the signal acquirer 220 may notify the deception detector 260 that no signal is acquired for the LHCP signal. Then, the deception detector 260 may be notified of no signal acquired for the LHCP signal by the signal acquirer 220. Thus, the deception detector 260 may determine that there is no deception signal. When the deception detector 260 determines that there is no deception signal, the satellite navigation receiver 200 may estimate the location based on the navigation solution calculated by the navigation solution calculator 250.

On the other hand, under the condition that the deception attacker 300 makes a deceptive attack, the navigation satellite receiver 200 with the foregoing configuration may process the received signal as follows. First, the navigation satellites 100 may transmit the navigation signals to the navigation satellite receiver 200. Here, the navigation signal may be the RHCP navigation signal. Then, the RHCP receiving module 211 of the signal receiver 210 may receive the RHCP navigation signals from the navigation satellites 100.

In this case, the deception attacker 300 may receive the navigation signal 101 from each navigation satellite 100. In addition, the deception attacker 300 may generate a false deception signal 301 to be synchronized with the received navigation signal 101 and transmit the deception signal 301 toward the satellite navigation receiver 200. In this case, the deception attacker 300 may generate the deception signals 301 for the plurality of navigation signals 101 received from the plurality of navigation satellites 100, and transmit the deception signals toward the satellite navigation receiver 200. Here, the deception signal 301 may include the RHCP deception signal and the LHCP deception signal. Thus, the deception attacker 300 may transmit the RHCP and LHCP deception signals corresponding to the plurality of navigation satellites 100 to the navigation satellite receiver 200.

Then, the signal receiver 210 may receive the deception signals 301. Specifically, the RHCP receiving module 211 of the signal receiver 210 may receive the RHCP deception signals from the deception attacker 300. In addition, the LHCP receiving module 212 of the signal receiver 210 may receive the LHCP deception signals from the deception attacker 300. Thus, the RHCP receiving module 211 may provide the RHCP signal, which includes the RHCP navigation signals received from the navigation satellites 100 and the RHCP deception signals received corresponding to the navigation satellites 100 from the deception attacker 300, to the signal acquirer 220. Further, the LHCP receiving module 212 may provide the LHCP deception signals, which are received corresponding to the navigation satellites 100 from the deception attacker 300, to the signal acquirer 220.

Next, the signal acquirer 220 may perform the signal acquisition process of detecting the code position and the Doppler frequency through the two-dimensional search for the code delay and the Doppler frequency with respect to each RHCP signal. Here, the signal acquisition process may be a process for detecting the code position and the Doppler frequency of each RHCP signal. Such a signal acquisition process may be performed on the principle that the highest signal strength is detected when the C/A code generated for the navigation satellite 100 matches and the C/A code of the signal received from that navigation satellite 100. The signal acquirer 220 may measure the signal strength by moving the C/A code generated by itself at the Doppler frequencies at intervals of 1 chip until the generated C/A code has a correlation with the C/A code of that navigation satellite 100, and determine the code position and the Doppler frequency of that navigation satellite 100 based on the measured signal strength. In addition, the signal acquirer 220 may provide the code position and the Doppler frequency detected with respect to each RHCP signal to the signal tracker 230.

Here, the RHCP signal may be a combination signal of the RHCP navigation signal and the RHCP deception signal. In this case, the reception signal strength of the RHCP deception signal may be higher than that of the RHCP navigation signal. Therefore, the signal acquirer 220 may perform the signal acquisition for the combination signal of the RHCP navigation signal and the RHCP deception signal (i.e., the RHCP signal) in the signal acquisition process.

Thus, the signal acquirer 220 may measure the carrier-to-noise density ratio (C/No), reception signal strength, code position, Doppler frequency, carrier phase, and pseudorange for each RHCP signal. In addition, the signal acquirer 220 may provide the C/No information, the code position information, the reception signal strength information, the Doppler frequency information, the carrier phase information, the pseudorange information, etc. measured for each RHCP signal to the deception detector 260. Further, the signal acquirer 220 may provide the code position information and Doppler frequency information calculated for the RHCP signal to the signal tracker 230.

Meanwhile, the signal tracker 230 may calculate bit information by tracking each combination signal of the RHCP navigation signal and the RHCP deception signal (i.e., the RHCP signal) through a code tracking loop and a carrier based on the code position and the determined Doppler frequency, and measures a pseudorange. In this case, the signal tracker 230 may use a PLL, a FLL, etc. as a carrier tracking loop, and use a DLL as the code tracking loop. The signal tracker 230 may provide the bit information calculated with respect to each combination signal (i.e., the RHCP signal) to the message decoder 240, and provide pseudorange measurement information calculated with respect to each combination signal (i.e., the RHCP signal) to the navigation solution calculator 250.

Thus, the message decoder 240 may decode each combination signal of the RHCP navigation signal and the RHCP deception signal based on the bit information calculated by the signal tracker 230 with respect to each combination signal (i.e., the RHCP signal), thereby extracting each navigation message. In addition, the message decoder 240 may provide each extracted navigation message to the navigation solution calculator 250. Meanwhile, the navigation solution calculator 250 may calculate the location by calculating each navigation solution based on each navigation message received from the message decoder 240 and the pseudorange measurement information received from the signal tracker 230. Further, the navigation solution calculator 250 may calculate a navigation solution error of each navigation solution and provide the navigation solution error to the deception detector 260.

Meanwhile, the signal acquirer 220 may perform the signal acquisition process of detecting the code position and the Doppler frequency through the two-dimensional search for the code delay and the Doppler frequency with respect to each LHCP deception signal. Here, the signal acquisition process may be a process for detecting the code position and the Doppler frequency of each LHCP deception signal. Further, the signal acquisition process may be a process for detecting a satellite number included in each LHCP deception signal. Such a signal acquisition process may be performed on the principle that the highest signal strength is detected when the C/A code generated for the navigation satellite 100 matches and the C/A code of the signal received from that navigation satellite 100. The signal acquirer 220 may measure the signal strength by moving the C/A code generated by itself at the Doppler frequencies at intervals of 1 chip until the generated C/A code has a correlation with the C/A code of that navigation satellite 100, and determine the satellite number, the code position and the Doppler frequency of that navigation satellite 100 based on the measured signal strength. In addition, the signal acquirer 220 may provide the code position and the Doppler frequency detected with respect to each LHCP deception signal, together with the satellite number, to the deception detector 260.

Meanwhile, the deception detector 260 may receive the code position and the Doppler frequency detected by the signal acquirer 220 with respect to each LHCP deception signal, together with the satellite number. Thus, the deception detector 260 may determine the presence of the deception signal with respect to a channel of a corresponding satellite. In this way, the satellite navigation receiver 200 may not use the navigation solution of the corresponding channel of the corresponding satellite when the deception detector 260 determines the presence of the deception signal.

Here, the deception detector 260 may determine the presence of the deception signal based on whether the LHCP deception signal is detected. However, alternatively, the deception detector 260 may suspect the presence of the deception signal based on the measurement information about the RHCP signal. Here, the measurement information may include at least one of the C/No, the reception signal strength, the code position, the Doppler frequency, the carrier phase or the pseudorange measured by the signal acquirer 220 with respect to the RHCP signal. In addition, the deception detector 260 may determine the presence of the deception signal based on whether the LHCP deception signal is detected, when the presence of the deception signal is suspected based on such measurement information.

Alternatively, the deception detector 260 may determine the presence of the deception signal based on a navigation solution error of the RHCP signal. Then, when the deception signal is suspected based on such a navigation solution error, the deception detector 260 may finally determine the presence of the deception signal based on whether the LHCP deception signal is detected.

Alternatively, the deception detector 260 may suspect the presence of the deception signal based on the measurement information of the RHCP signal. Here, the measurement information may include at least one of the C/No, the reception signal strength, the code position, the Doppler frequency, the carrier phase or the pseudorange measured by the signal acquirer 220 with respect to the RHCP signal. In addition, the deception detector 260 may determine the presence of the deception signal based on the navigation solution error of the RHCP signal, when the presence of the deception signal is suspected based on such measurement information. Then, when the presence of the deception signal is suspected based on such a navigation solution error, the deception detector 260 may finally determine the presence of the deception signal based on whether the LHCP deception signal is detected.

Figure 3:
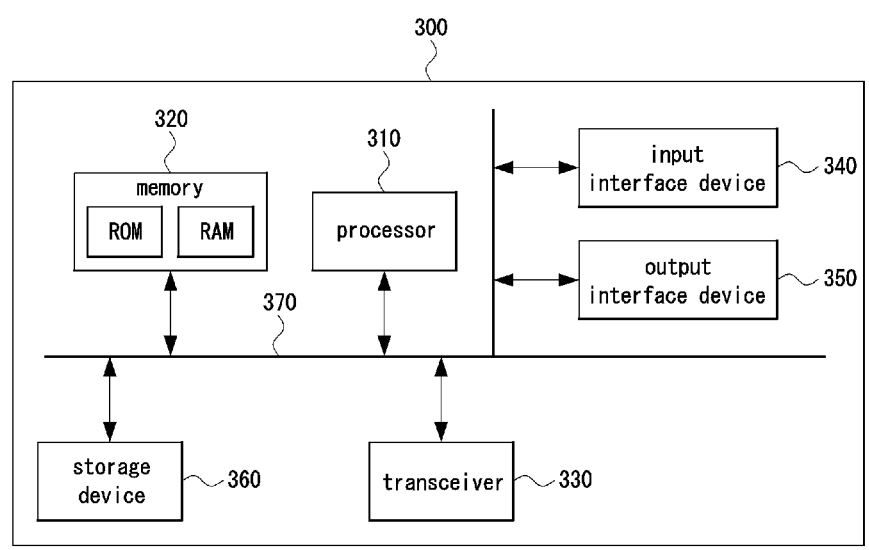
FIG. 3 is a block diagram showing a first embodiment of a communication node in the global navigation satellite system.

FIG. 3 is a block diagram showing a first embodiment of a communication node in the global navigation satellite system.

Referring to FIG. 3, a communication node 300 refers to a satellite navigation receiver and may include at least one processor 310, a memory 320, and a transceiver 330 connected to a network and performing communication. Further, the communication node 300 may further include an input interface device 340, an output interface device 350, a storage device 360. The elements included in the communication node 300 are connected via a bus 370 and communicate with each other. However, the elements included in the communication node 300 may be connected via not a common bus 370 but an individual interface or bus centering on the processor 310. For example, the processor 310 may be connected to at least one of the memory 320, the transceiver 330, the input interface device 340, the output interface device 350, and the storage device 360 via a dedicated interface.

The processor 310 may execute a program command stored in at least one of the memory 320 and the storage device 360. The processor 310 may refer to a central processing unit (CPU), a graphics processing unit (GPU), or a dedicated processor for performing methods according to embodiments of the disclosure. Each of the memory 320 and the storage device 360 may be configured as at least one of a volatile storage medium and a nonvolatile storage medium. For example, the memory 320 may be configured as at least one of a read only memory (ROM) and a random access memory (RAM).

Figure 4:
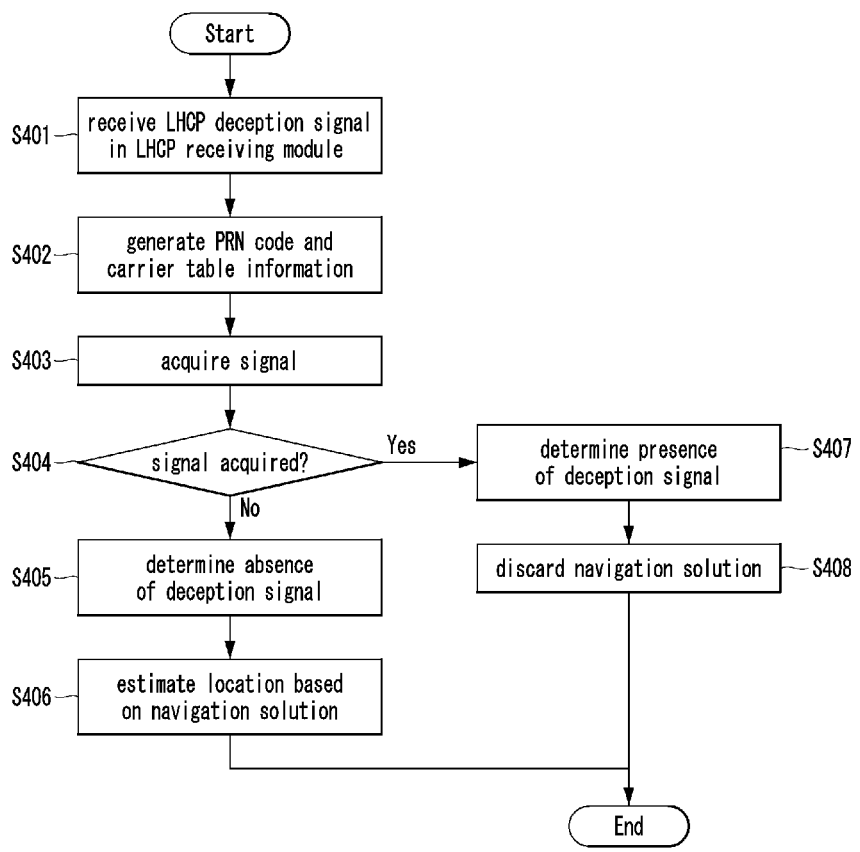
FIG. 4 is a flowchart showing a first embodiment of a method of detecting a deception signal in a global navigation satellite system.

FIG. 4 is a flowchart showing a first embodiment of a method of detecting a deception signal in a global navigation satellite system.

Referring to FIG. 4, each navigation satellite in the method of detecting the deception signal may transmit a navigation signal to the navigation satellite receiver. Here, the navigation signal may include the RHCP navigation signal. Then, the RHCP receiving module of the signal receiver may receive the RHCP navigation signal from each navigation satellite. The signal receiver may receive the navigation signal from each navigation satellite. Specifically, the RHCP receiving module of the signal receiver may receive the RHCP navigation signal from each navigation satellite.

Meanwhile, the deception attacker may receive the navigation signal from each navigation satellite. In addition, the deception attacker may generate a false deception signal to be synchronized with the received navigation signal and transmit the deception signal toward the satellite navigation receiver. In this case, the deception attacker may generate the deception signals for the plurality of navigation signals received from the plurality of navigation satellites, and transmit the deception signals toward the satellite navigation receiver. Here, the deception signal may include the RHCP deception signal and the LHCP deception signal. Further, the deception attacker may transmit only the RHCP deception signal like the navigation satellite. In this case, the LHCP deception signal may derive as the RHCP deception signal is reflected from various structures on the ground and the surface of the earth during the transmission.

Then, the signal receiver may receive the deception signals from the deception attacker. In other words, the RHCP receiving module of the signal receiver may receive the RHCP deception signal from the deception attacker. In addition, the LHCP receiving module of the signal receiver may receive the LHCP deception signal from the deception attacker (S401).

Thus, the RHCP receiving module may provide the RHCP signals, which include the RHCP navigation signal received from each navigation satellite and each RHCP deception signal received from the deception attacker, to the signal acquirer. Further, the LHCP receiving module may provide each LHCP deception signal received from the deception attacker to the signal acquirer. In this case, the RHCP receiving module may provide a sampling digital circular polarization signal obtained by sampling an analog circular polarization signal to the signal acquirer. Further, the LHCP receiving module may provide a sampling digital deception signal obtained by sampling an analog deception signal to the signal acquirer.

Next, the signal acquirer may perform the signal acquisition process of detecting the code position and the Doppler frequency with respect to each RHCP signal through the two-dimensional search for the code delay and the Doppler frequency. The signal acquirer may provide the code position and the Doppler frequency detected with respect to each RHCP signal to the signal tracker. Here, the RHCP signal may be a combination of the RHCP navigation signal and the RHCP deception signal.

In this case, the reception signal strength of the RHCP deception signal may be higher than that of the RHCP navigation signal. Therefore, the signal acquirer may perform the signal acquisition for the combination signal of each RHCP navigation signal and each RHCP deception signal (i.e., the RHCP signal) in the signal acquisition process. Thus, the signal acquirer may calculate the C/No, reception signal strength, code position, Doppler frequency, carrier phase, and pseudorange for each combination signal of each RHCP navigation signal and each RHCP deception signal. In addition, the signal acquirer may provide the code position information and Doppler frequency information calculated for each combination signal of each RHCP navigation signal and each RHCP deception signal to the signal tracker. Here, the signal acquirer may use a serial or parallel search method such as the fast Fourier transform for a signal acquisition algorithm.

Meanwhile, the signal tracker may calculate bit information by tracking each combination signal of the RHCP navigation signal and the RHCP deception signal through a code tracking loop and a carrier based on the determined code position and determined Doppler frequency, and measures a pseudorange. In this case, the signal tracker may use a PLL, a FLL, etc. as a carrier tracking loop, and use a DLL as the code tracking loop. The signal tracker may provide the bit information calculated with respect to each RHCP navigation signal to the message decoder, and provide pseudorange measurement information about each RHCP navigation signal to the navigation solution calculator.

Thus, the message decoder may decode each combination signal of the RHCP navigation signal and the RHCP deception signal based on the bit information calculated by the signal tracker, thereby extracting each navigation message. In addition, the message decoder may provide each extracted navigation message to the navigation solution calculator. Meanwhile, the navigation solution calculator may calculate each navigation solution based on each navigation message received from the message decoder and the pseudorange measurement information received from the signal tracker.

Meanwhile, the signal acquirer may generate a PRN code and carrier table information (S402), and perform the signal acquisition process for detecting the code position and the Doppler frequency through the two-dimensional search for the code delay and the Doppler frequency with respect to each LHCP deception signal (S403). Further, the signal acquirer may calculate a satellite number with respect to each LHCP deception signal. Here, the signal acquisition process may be a process for detecting the code position and the Doppler frequency of each LHCP deception signal. Further, the signal acquisition process may be a process for detecting the satellite number with respect to each LHCP deception signal.

Such a signal acquisition process may be performed on the principle that the highest signal strength is detected when the C/A code generated for the navigation satellite matches and the C/A code of the signal received from that navigation satellite. The signal acquirer may measure the signal strength by moving the C/A code generated by itself at the Doppler frequencies at intervals of 1 chip until the generated C/A code has a correlation with the C/A code of that navigation satellite, and determine the code position and the Doppler frequency of that navigation satellite based on the measured signal strength. In addition, the signal acquirer may provide the code position and the Doppler frequency detected with respect to each LHCP deception signal, and the satellite number to the deception detector.

Meanwhile, the deception detector may receive the code position and the Doppler frequency detected by the signal acquirer with respect to each LHCP deception signal, together with the satellite number. Thus, the deception detector may determine whether a signal is successfully acquired (S404). In this case, the deception detector may determine the presence of the deception signal with respect to the channel of the corresponding satellite determined as the successful acquisition of the signal (S407). In this way, the satellite navigation receiver may not use but discard the navigation solution of the corresponding channel of the corresponding satellite when the deception detector determines the presence of the deception signal (S408). In this way, the deception detector may determine the presence of the deception signal based on whether the LHCP deception signal is detected.

On the other hand, when the deception signal is absent, steps S401 to S403 may not be carried out. Thus, when the deception detector determines whether a signal is successfully acquired (S404), it may be determined that the signal is not acquired. In this case, the deception detector may determine the absence of the deception signal (S405), and notify the navigation solution calculator of the absence of the deception signal. Then, the navigation solution calculator may estimate its location based on the calculated navigation solution (S406).

Figure 5:
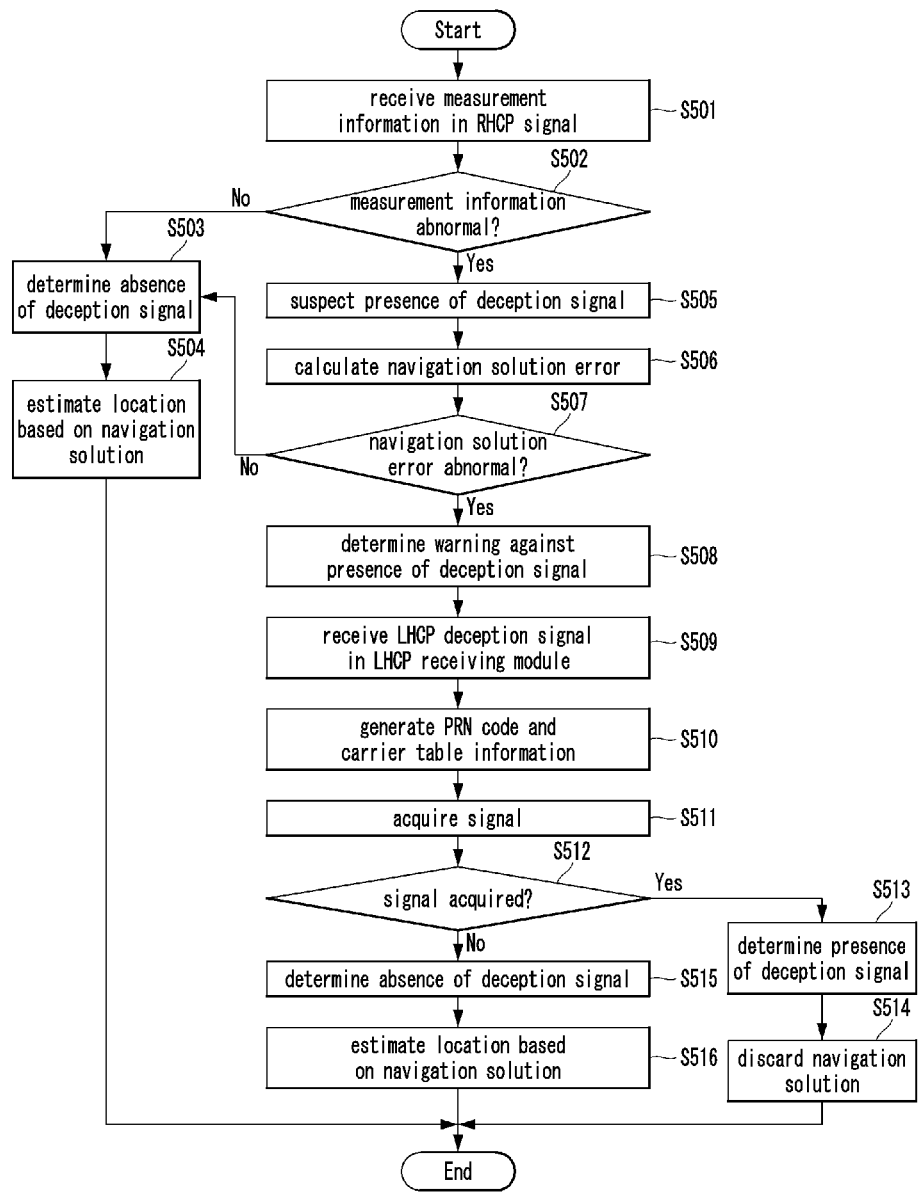
FIG. 5 is a flowchart showing a second embodiment of a method of detecting a deception signal in a global navigation satellite system.

FIG. 5 is a flowchart showing a second embodiment of a method of detecting a deception signal in a global navigation satellite system.

Referring to FIG. 5, each navigation satellite in the method of detecting the deception signal may transmit a navigation signal to the navigation satellite receiver. Here, the navigation signal may include the RHCP navigation signal. Then, the RHCP receiving module of the signal receiver may receive the RHCP navigation signal from each navigation satellite. The signal receiver may receive the navigation signal from each navigation satellite. Specifically, the RHCP receiving module of the signal receiver may receive the RHCP navigation signal from each navigation satellite.

Meanwhile, the deception attacker may receive the navigation signal from each navigation satellite. In addition, the deception attacker may generate a false the deception signal to be synchronized with the received navigation signal and transmit the deception signal toward the satellite navigation receiver. In this case, the deception attacker may generate the deception signals for the plurality of navigation signals received from the plurality of navigation satellites, and transmit the deception signals toward the satellite navigation receiver. Here, the deception signal may include the RHCP deception signal and the LHCP deception signal. Further, the deception attacker may transmit only the RHCP deception signal like the navigation satellite. In this case, the LHCP deception signal may derive as the RHCP deception signal is reflected from various structures on the ground and the surface of the earth during the transmission. Then, the signal receiver may receive the deception signals from the deception attacker. In other words, the RHCP receiving module of the signal receiver may receive the RHCP deception signal from the deception attacker. In addition, the LHCP receiving module of the signal receiver may receive the LHCP deception signal from the deception attacker.

Thus, the RHCP receiving module may provide each RHCP signals, i.e., each combination signal of each received RHCP navigation signal and each RHCP deception signal, to the signal acquirer. Further, the LHCP receiving module may provide each received LHCP deception signal to the signal acquirer.

Next, the signal acquirer may perform the signal acquisition process of detecting the code position and the Doppler frequency through the two-dimensional search for the code delay and the Doppler frequency with respect to each RHCP signal. Here, the signal acquisition process may be a process for detecting the code position and the Doppler frequency of each RHCP signal. Further, the signal acquisition process may be a process for detecting a satellite number for each RHCP signal.

Such a signal acquisition process may be performed on the principle that the highest signal strength is detected when the C/A code generated for the navigation satellite matches and the C/A code of the signal received from that navigation satellite. The signal acquirer may measure the signal strength by moving the C/A code generated by itself at the Doppler frequencies at intervals of 1 chip until the generated C/A code has a correlation with the C/A code of that navigation satellite, and determine the code position and the Doppler frequency of that navigation satellite based on the measured signal strength. In addition, the signal acquirer may provide the detected code position and the detected Doppler frequency to the signal tracker. In this case, the signal acquirer may detect a satellite number with respect to each RHCP signal, and provide the detected satellite number together with the code position and the Doppler frequency to the signal tracker.

Here, the RHCP signal may be a combination signal of the RHCP navigation signal and the RHCP deception signal.

In this case, the reception signal strength of the RHCP deception signal may be higher than that of the RHCP navigation signal. Therefore, the signal acquirer may perform the signal acquisition for the combination signal of the RHCP navigation signal and the RHCP deception signal (i.e., the RHCP signal) in the signal acquisition process. Thus, the signal acquirer may calculate the C/No, reception signal strength, code position, Doppler frequency, carrier phase, and pseudorange for each combination signal of each RHCP navigation signal and each RHCP deception signal (S501). In addition, the signal acquirer may provide the C/No information, the code position information, the reception signal strength information, the Doppler frequency information, the carrier phase information, the pseudorange information, etc. calculated for each combination signal of each RHCP navigation signal and each RHCP deception signal to the deception detector.

Thus, the deception detector may suspect the presence of the deception signal based on the measurement information about the RHCP signal. Here, the measurement information may include at least one of the C/No, the reception signal strength, the code position, the Doppler frequency, the carrier phase or the pseudorange measured by the signal acquirer with respect to the RHCP signal. In addition, the deception detector may determine whether the measurement information for each RHCP signal is abnormal (S502). When the measurement information is not abnormal, the deception detector may determine the absence of the deception signal (S503) and estimate the location based on the navigation solution (S504).

In other words, the signal tracker may calculate bit information of each RHCP navigation signal by tracking each RHCP navigation signal through a code tracking loop and a carrier based on the code position and Doppler frequency determined with respect to each RHCP signal, and measures a pseudorange of each RHCP navigation signal. In this case, the signal tracker may use a PLL, a FLL, etc. as a carrier tracking loop, and use a DLL as the code tracking loop. The signal tracker may provide the bit information to the message decoder, and provide pseudorange measurement information to the navigation solution calculator.

Thus, the message decoder may decode each navigation signal based on the bit information calculated by the signal tracker, thereby extracting each navigation message. In addition, the message decoder may provide each extracted navigation message to the navigation solution calculator. Thus, the navigation solution calculator may calculate the location by calculating each navigation solution based on the navigation message received from the message decoder and the pseudorange measurement information received from the signal tracker.

In contrast, in step S502, if an abnormality is found in the measurement information, the deception detector can determine the existence of the deception signal as a suspicious step (S505). In this way, if the navigation satellite receiver determines the existence of the deception signal as a suspicious step, it can calculate the navigation solution error (S506) and determine the existence of the deception signal again (S507). Here, the deception detector determining the existence of the deception signal as a suspicious step in step S502 may mean estimating the existence of the deception signal.

In other words, the signal acquirer may provide the code position information and the Doppler frequency information, which are calculated to each combination signal of each RHCP navigation signal and each RHCP deception signal, to the signal tracker. The signal tracker may calculate bit information by tracking each combination signal of each RHCP navigation signal and each RHCP deception signal through a code tracking loop and a carrier based on each determined code position and each determined Doppler frequency, and measure each pseudorange. In this case, the signal tracker may use a PLL, a FLL, etc. as a carrier tracking loop, and use a DLL as the code tracking loop. The signal tracker may provide the bit information to the message decoder, and provide pseudorange measurement information to the navigation solution calculator.

Thus, the message decoder may decode each combination signal of the RHCP navigation signal and the RHCP deception signal based on the bit information calculated by the signal tracker, thereby extracting each navigation message. In addition, the message decoder may provide each extracted navigation message to the navigation solution calculator. Meanwhile, the navigation solution calculator may calculate each navigation solution based on each navigation message received from the message decoder and the pseudorange measurement information received from the signal tracker. Further, the navigation solution calculator 250 may calculate each navigation solution error and provide the navigation solution error to the deception detector.

Meanwhile, the deception detector may determine whether each navigation solution error of each the RHCP signal is abnormal, when the presence of the deception signal is suspected based on the measurement information (S507). In this case, when the measurement information is not abnormal, the deception detector may determine the absence of the deception signal (S503) and estimate the location based on the navigation solution (S504). On the other hand, when each navigation solution error is abnormal as a result of the determination, the deception detector may determine a warning step against the presence of the deception signal (S508). Here, in the step S508, when the deception detector determines the warning step against the presence of the deception signal, it may mean that the presence of the deception signal is estimated again.

Here, when the C/No is used as the measurement information, the deception detector may obtain the reception signal strength based on the C/No. In this regard, the deception signal may have a reception signal strength higher by 3 to 5 dB. Therefore, the deception detector may determine the presence of the deception signal when the reception signal strength calculated based on the C/No becomes higher by 3 to 5 dB. Next, when the reception signal strength is used as the measurement information, the deception detector may determine the presence of the deception signal when the reception signal strength becomes higher by 3 to 5 dB.

Meanwhile, the pseudorange measured at a stationary satellite navigation receiver is caused by the movement of the satellite, and variation in such a pseudorange may occur at regular intervals. Therefore, when the pseudorange is used as the measurement information, the deception detector may determine the presence of the deception signal when the pseudorange varies by more than a predetermined interval. Likewise, the Doppler frequency measured at a stationary satellite navigation receiver is caused by the movement of the satellite, and variation in such a Doppler frequency may occur at regular intervals. Therefore, when the Doppler frequency is used as the measurement information, the deception detector may determine the presence of the deception signal when the Doppler frequency varies by more than a predetermined interval. Similarly, the carrier phase measured at a stationary satellite navigation receiver is caused by the movement of the satellite, and variation in such a carrier phase may occur at regular intervals. Therefore, when the carrier phase is used as the measurement information, the deception detector may determine the presence of the deception signal when the carrier phase varies by more than a predetermined interval. Next, the deception detector may determine the presence of the deception signal when the navigation solution error is greater than an error range of a GPS signal with respect to the absolute coordinates of the stationary satellite navigation receiver.

Meanwhile, the deception attacker may transmit each LHCP deception signal to the navigation satellite receiver. Then, the LHCP receiving module of the signal receiver may receive each LHCP deception signal from the deception attacker (S509). Thus, the LHCP receiving module may provide each received LHCP deception signal to the signal acquirer.

Next, the signal acquirer may generate a PRN code and carrier table information (S510), and perform the signal acquisition process for detecting the code position and the Doppler frequency through the two-dimensional search for the code delay and the Doppler frequency with respect to each LHCP deception signal (S511). Here, the signal acquisition process may be a process for detecting each code position and each Doppler frequency of each LHCP deception signal. Such a signal acquisition process may be performed on the principle that the highest signal strength is detected when the C/A code generated for the navigation satellite matches and the C/A code of the signal received from that navigation satellite. The signal acquirer may measure the signal strength by moving the C/A code generated by itself at the Doppler frequencies at intervals of 1 chip until the generated C/A code has a correlation with the C/A code of that navigation satellite, and determine the code position and the Doppler frequency of that navigation satellite based on the measured signal strength. In addition, the signal acquirer may provide each code position and each Doppler frequency detected with respect to each LHCP deception signal to the deception detector.

Meanwhile, the deception detector may receive each code position and each Doppler frequency detected by the signal acquirer with respect to each LHCP deception signal. Thus, the deception detector may determine whether a signal is successfully acquired (S512). In this case, the deception detector may determine that the signal is successfully acquired, and determine the presence of the deception signal with respect to the channel of the corresponding satellite (S513). In this way, the satellite navigation receiver may not use but discard the navigation solution of the corresponding channel of the corresponding satellite when the deception detector determines the presence of the deception signal (S514). In this way, the deception detector may determine the presence of the deception signal based on whether the LHCP deception signal is detected.

On the other hand, when the deception signal is absent, steps S509 to S511 may not be carried out. Thus, when the deception detector determines whether a signal is successfully acquired (S512), it may be determined that the signal is not acquired. In this case, the deception detector may determine the absence of the deception signal (S515), and notify the navigation solution calculator of the absence of the deception signal. Then, the navigation solution calculator may estimate its location based on the calculated navigation solution (S516).

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A method of operating a satellite navigation receiver in a global navigation satellite system, the method comprising:
 receiving a satellite navigation signal;
 performing a first signal acquisition process through a two-dimensional search for a code delay and a Doppler frequency with respect to at least one left-handed circular polarization (LHCP) signal only included in the satellite navigation signal, while excluding at least one right-handed circular polarization (RHCP) signal from the first signal acquisition process;
 confirming that acquisition of at least one first satellite number, at least one first code position, and at least one pieces of first Doppler information corresponding to the at least one LHCP signal has been successfully performed through the first signal acquisition process; and
 confirming presence of a deception signal based on the confirmed acquisition.

2. The method of claim 1, wherein the performing the first signal acquisition process through the two-dimensional search for the code delay and the Doppler frequency with respect to the at least one LHCP signal included in the satellite navigation signal comprises:
 sampling the at least one LHCP signal included in the satellite navigation signal into a digital LHCP signal;
 generating a satellite navigation pseudo random noise (PRN) code and carrier table information; and
 detecting the at least one first satellite number, the at least one first code position, and the at least one piece of first Doppler information in the digital LHCP signal based on the satellite navigation PRN code and the carrier table information through the two-dimensional search for the code delay and the Doppler frequency.

3. The method of claim 1, further comprising:
 performing a second signal acquisition process with respect to the at least one right-handed circular polarization (RHCP) signal included in the satellite navigation signal;
 detecting at least one second satellite number, at least one second code position, and at least one pieces of second Doppler information through the second signal acquisition process;
 calculating at least one navigation solution based on the at least one second satellite number, the at least one second code position, and the at least one piece of second Doppler information; and
 estimating a location based on a navigation solution obtained by excluding a navigation solution, which is calculated from the RHCP signal corresponding to the at least one first satellite number, from the at least one navigation solution.

4. A method of operating a satellite navigation receiver in a global navigation satellite system, the method comprising:
 receiving a satellite navigation signal;
 estimating presence of at least one deception signal based on at least one right-handed circular polarization (RHCP) signal included in the satellite navigation signal; and
 in response to the estimating indicating the presence of the at least one detection signal, determining whether the at least one deception signal is present based on at least one left-handed circular polarization (LHCP) signal included in the satellite navigation signal,
 wherein the estimating of the presence of the at least one deception signal is performed before the determining of the presence of the at least one deception signal.

5. The method of claim 4, wherein the estimating the presence of the at least one deception signal based on the at least one RHCP signal included in the satellite navigation signal comprises:
 acquiring measurement information with respect to each of the at least one RHCP signal included in the satellite navigation signal; and
 estimating the presence of the at least one deception signal by determining whether the acquired measurement information is abnormal.

6. The method of claim 5, wherein the measurement information comprises at least one of a carrier-to-noise density ratio (C/No), a reception signal strength, a code position, a Doppler frequency, a carrier phase, or a pseudorange.

7. The method of claim 4, wherein the estimating the presence of the at least one deception signal based on the at least one RHCP signal included in the satellite navigation signal comprises:
 acquiring each code position and each Doppler frequency with respect to the at least one RHCP signal included in the satellite navigation signal;
 calculating each navigation solution error based on each code position and each Doppler frequency; and
 estimating the presence of the at least one deception signal by determining whether the calculated navigation solution error is abnormal.

8. The method of claim 7, wherein the calculating each navigation solution error based on each code position and each Doppler frequency comprises:
 calculating each piece of bit information based on each code position and each Doppler frequency;
 generating each navigation message based on each piece of bit information;
 calculating each piece of pseudorange measurement information based on each code position and each Doppler frequency;
 calculating each navigation solution based on each piece of bit information and each navigation message; and
 calculating each navigation solution error based on each navigation solution.

9. The method of claim 4, wherein the estimating the presence of the at least one deception signal based on the at least one RHCP signal included in the satellite navigation signal comprises:
 acquiring each piece of measurement information with respect to at least one RHCP signal included in the satellite navigation signal;
 estimating the presence of the at least one deception signal based on the acquired measurement information;
 acquiring each code position and each Doppler frequency with respect to at least one RHCP signal included in the satellite navigation signal when the presence of the at least one deception signal is estimated as a result of the estimating;
 calculating each navigation solution error based on each code position and each Doppler frequency; and
 estimating the presence of the at least one deception signal again based on the calculated navigation solution errors.

10. A satellite navigation receiver comprising:
a processor,
the processor being configured to control the satellite navigation receiver to:
receive a satellite navigation signal;
estimate presence of at least one deception signal based on at least one right-handed circular polarization (RHCP) signal included in the satellite navigation signal; and
determine whether the at least one deception signal is present based on at least one left-handed circular polarization (LHCP) signal included in the satellite navigation signal when the presence of the at least one deception signal is estimated,
wherein the presence of the at least one deception signal is performed before the presence of the at least one deception signal.

11. The satellite navigation receiver of claim 10, wherein, when the presence of the at least one deception signal is estimated based on the at least one RHCP signal included in the satellite navigation signal, the processor is configured to control the satellite navigation receiver to:

acquire measurement information with respect to each of the at least one RHCP signal included in the satellite navigation signal; and
estimate the presence of the at least one deception signal by determining whether the acquired measurement information is abnormal.

12. The satellite navigation receiver of claim 10, wherein, when the presence of the at least one deception signal is estimated based on the at least one RHCP signal included in the satellite navigation signal, the processor is configured to control the satellite navigation receiver to:

acquire each code position and each Doppler frequency with respect to the at least one RHCP signal included in the satellite navigation signal;
calculate each navigation solution error based on each code position and each Doppler frequency; and
estimate the presence of the at least one deception signal by determining whether the calculated navigation solution error is abnormal.

* * * * *